Nov. 4, 1941.  W. A. RAY  2,261,562
FLUID CONTROL VALVE
Filed June 1, 1939
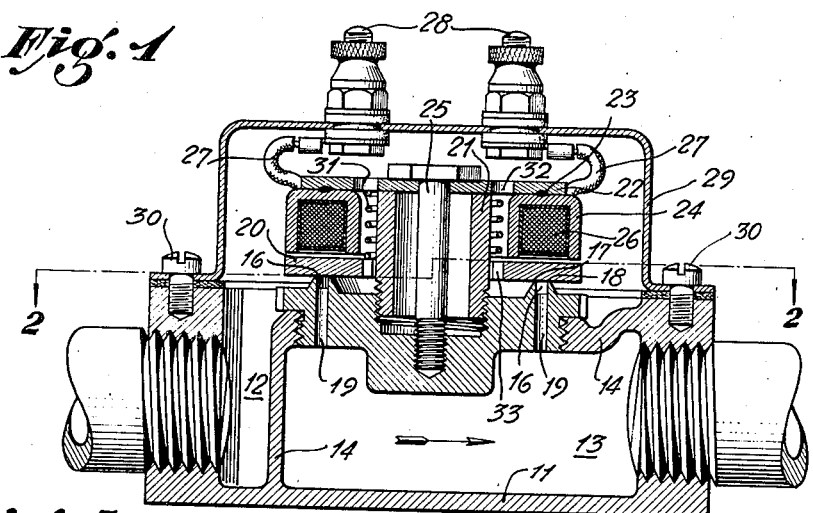
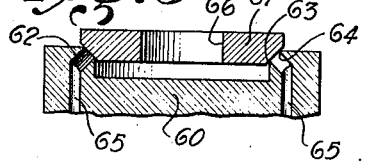
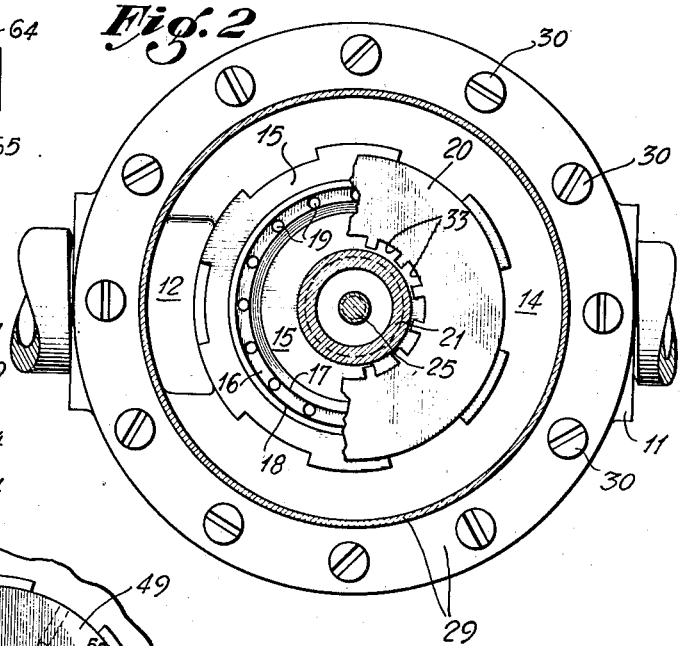
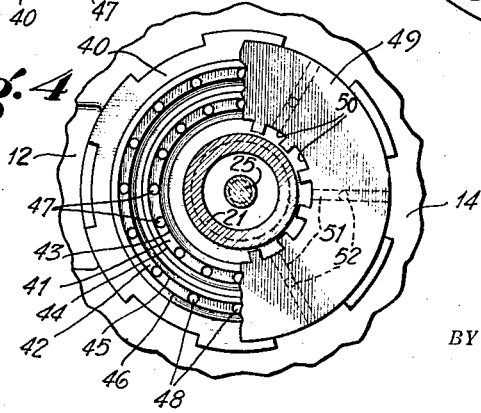
WILLIAM A. RAY,
INVENTOR;
BY John H. Rouse,
ATTORNEY.

Patented Nov. 4, 1941

2,261,562

UNITED STATES PATENT OFFICE 2,261,562

FLUID CONTROL VALVE

William A. Ray, Glendale, Calif.

Application June 1, 1939, Serial No. 276,757

3 Claims. (Cl. 137—139)

My present invention relates to fluid control valves and particularly to those of the type in which a valve member is moved into and out of engagement with a valve seat to control fluid flow through the valve.

It is a main object of my invention to provide in such a valve novel closure means therefor which permit large fluid flow through the valve by relatively slight movement of the valve member with respect to the seat.

Another object of my invention is to provide a valve port in the form of an annular recess and closure means therefor permitting, in its open position, fluid flow into the recess from both sides thereof.

While not so limited, the novel means of my invention have particular utility in a sensitive electromagnetically operated gas valve in which the valve member, according to my invention, need be moved but a few one-thousandths of an inch in order to provide adequate passage of fuel to a domestic heating device. The power required to operate such a valve is in the order of a few milliwatts, and such power is readily furnished by an ordinary pilot-burner-heated thermoelectric device. It is therefore a further object of my invention to provide such a valve.

Other objects and advantages of my invention will be found in the description, the drawing and the appended claims.

For complete understanding of the invention, reference may be had to the following detailed description and accompanying drawing, wherein:

Figure 1 is a sectional view of a valve embodying my invention;

Figure 2 is a section taken along the irregular line 2—2 of Fig. 1;

Figure 3 is a fragmentary sectional view of a valve similar to that shown in Fig. 1 but having a modified valve member and valve port member;

Figure 4 is a fragmentary section taken generally along the irregular line 4—4 of Fig. 3; and Figure 5 is a sectional view of a modified form of valve port member and valve member according to my invention.

In the drawing, the numeral 11 indicates a valve casing having an inlet 12 and an outlet 13 separated by a partition 14. Threadedly received in an opening in the horizontal portion of said partition is a valve port member 15 in the upper surface of which is provided an annular recess 16, the side walls of the recess terminating at said surface in a single plane to form an inner and an outer valve seat 17 and 18, respectively. Preferably, the surface of the port member surrounding the valve seats is relieved as shown so that the material of the seats projects upwardly at a sharp angle to the surface. Fluidly connecting the recess 16 with the outlet 13 of the valve are openings 19.

Cooperable with the seats 17 and 18 is an annular valve member 20 of magnetic material. Threadedly carried by the port member 15 is a tubular member 21 extending through the central opening of the valve member 20 and supporting at its upper end a disk 22 to which is secured, as by spot welding at 23, an annular inverted trough-like receptacle 24 of magnetic material. The disk 22 is held in engagement with the tubular member 21 by a screw 25 threaded into the port member 15.

Within the receptacle 24 is an energizing coil 26 having leads 27 connected to terminals 28 insulatingly supported in a housing 29 which is secured to the valve casing 11 by screws 30.

The valve member 20 has a free fit around the tubular member 21 and is downwardly biased into engagement with the seats 17 and 18 by a compression spring 31.

Fluid communication between the inlet 12 of the valve and the area adjacent the inner valve seat 17 is provided by openings 32 in disk 22 and notches 33 in the inner edge of the valve member.

The annular member 24 together with the coil 26 constitute an electromagnet which, when energized, attracts the magnetic valve member 20, lifting it against the bias of spring 31 out of engagement with the valve seats 17 and 18. Fluid can now flow from the valve inlet 12 into the recess 16 and thence through the openings 19 to the valve outlet 13.

Fluid flow into the recess is permitted, not only past the outer seat 18 which is directly within the inlet of the valve, but also past the inner seat 17 through the openings 32 and 33. In practice, the valve member 20 may be lifted only a few one-thousandths of an inch when the power available for energizing the electromagnet is small—such as, for example, is furnished by a pilot-burner-heated thermoelectric device. Under such conditions, fluid flow through this valve is almost twice that which would occur if an open port having but a single annular valve seat were employed.

When current flow through the coil of the electromagnet is interrupted, the valve member, aided by the bias of spring 31, falls, closing the valve. To insure "drop out," the members 24 and 20 are preferably made of a magnet iron alloy containing approximately 47 per cent nickel, which alloy, when properly heat treated, has very low magnetic residual. To further insure against "magnetic sticking" the cooperating surfaces of members 24 and 20 may be plated with a non-ferrous metal, such as copper, to provide a magnetic air gap.

Under some conditions, to prevent leakage at the valve seats, the lower surface of the valve member may be provided with a facing of flexible material such as leather or synthetic rubber. The amount of "lift" of the valve member can be regulated by adjustment of the threaded supporting member 21.

In the modification shown in Figs. 3 and 4, a valve port member 40 is provided in its upper surface with a plurality of annular recesses 41 and 42, the side walls of which terminate at said surface to form pairs of inner and outer valve seats 43 and 44, and 45 and 46, respectively. Openings 47 and 48 connect the recesses with the valve outlet. An annular valve member 49, cooperable with the seats, is provided in its inner edge with notches 50 communicating with the area adjacent the valve seat 43, and with openings 51 and 52 communicating with the area adjacent the seats 44 and 45. By this arrangement, fluid can flow through the valve port member, in the elevated position of the valve member, substantially equally past all of the seats—greatly increased flow through the valve thus resulting.

In Fig. 5 is shown a modified form of valve port member 60 and valve member 61. The cooperating surfaces of these members are beveled and an annular recess 62, providing an inner 63 and an outer 64 valve seat, is formed in the surface of member 60. Openings 65 connect the recess with the valve outlet, and opening 66 in member 61 permits fluid communication with the area adjacent the inner seat 63. The cooperating surfaces of members 60 and 61 may be further modified by making them of spherical form.

In the embodiments of my invention which I have herein shown and described by way of illustration, a "normally closed" valve is disclosed. Obviously, my invention is not so limited, as, by modification within the scope of a person skilled in the art, a "normally open" valve according to my invention may also be produced.

Also, it is obvious that further modifications may be made without departing from the spirit of my invention. I intend, therefore, that my invention be limited only by the scope of the appended claims.

I claim as my invention:

1. In an electromagnetically operated fluid control valve, a valve casing having an inlet and an outlet, a partition separating said inlet and said outlet, the inlet surface of said partition being provided with an annular recess, the side walls of said recess terminating at said surface in a pair of concentric valve seats, said recess having an opening communicating with said outlet, a valve member cooperable with said seats and normally held in engagement therewith by the aid of the pressure of the fluid in said inlet acting on the valve member across the surface area of said recess, said valve member having an opening therethrough interconnecting said inlet and the area adjacent the inner of said pair of valve seats so that when the valve member is lifted fluid can flow from the inlet to the outlet of the valve across both of said seats, and an electromagnet for lifting said valve member from said seats against the pressure of said fluid through a distance so small that the amount of fluid flow across both of the seats is considerably greater than that across a single one of the seats, the surface area of said recess being substantially equal to the sum of the areas of the openings between the cooperating surfaces of said valve member and said seats through which the fluid must pass when the valve member is in its maximum lifted position.

2. In an electromagnetically operated fluid control valve, a valve casing having an inlet and an outlet, a partition separating said inlet and said outlet, the inlet surface of said partition being provided with an annular recess, the side walls of said recess terminating at said surface in a pair of concentric valve seats, said recess having an opening communicating with said outlet, a valve member cooperable with said seats and normally held in engagement therewith by the aid of the pressure of the fluid in said inlet acting on the valve member across the surface area of said recess, said valve member having an opening therethrough interconnecting said inlet and the area adjacent the inner of said pair of valve seats, and an electromagnet for lifting said valve member from said seats against the pressure of said fluid, the surface area of said recess being substantially equal to the sum of the areas of the openings between the cooperating surfaces of said valve member and said seats through which the fluid must pass when the valve member is in its maximum lifted position.

3. In an electromagnetically operated fluid control valve, a valve casing having an inlet and an outlet, a partition separating said inlet and said outlet, the inlet surface of said partition being provided with an annular recess, the side walls of said recess terminating at said surface in a pair of concentric valve seats, said recess having an opening communicating with said outlet, a valve member cooperable with said seats and normally held in engagement therewith by the aid of the pressure of the fluid in said inlet acting on the valve member across the surface area of said recess, said valve member having an opening therethrough interconnecting said inlet and the area adjacent the inner of said pair of valve seats, and an electromagnet for lifting said valve member from said seats against the pressure of said fluid, the surface area of said recess being substantially equal to the sum of the areas of the openings between the cooperating surfaces of said valve member and said seats through which the fluid must pass when the valve member is in its maximum lifted position, the maximum distance through which said valve member is lifted and the surface area of said recess being so small that the valve can be opened with power in the order of that generated by a pilot-burner-heated thermoelectric device.

WILLIAM A. RAY.